United States Patent [19]
Wilkinson et al.

[11] Patent Number: 5,495,478
[45] Date of Patent: Feb. 27, 1996

[54] APPARATUS AND METHOD FOR PROCESSING ASYNCHRONOUS TRANSFER MODE CELLS

[75] Inventors: I. C. Keith Wilkinson, Newark; Jonathan R. Pearce, Mountain View, both of Calif.

[73] Assignee: DSC Communications Corporation, Plano, Tex.

[21] Appl. No.: 339,301

[22] Filed: Nov. 14, 1994

[51] Int. Cl.⁶ ................................. H04L 12/54
[52] U.S. Cl. ............. 370/58.2; 370/60.1; 370/85.6; 370/94.2; 340/825.51
[58] Field of Search ............... 370/58.1, 58.2, 370/60, 60.1, 85.6, 94.1, 94.2; 340/825.5, 825.51

[56] References Cited

U.S. PATENT DOCUMENTS

| | | | |
|---|---|---|---|
| 5,214,639 | 5/1993 | Henrion | 370/60 |
| 5,390,176 | 2/1995 | Schoute et al. | 370/60.1 |
| 5,390,184 | 2/1995 | Morris | 370/94.2 |
| 5,392,280 | 2/1995 | Zheng | 370/60 |
| 5,394,397 | 2/1995 | Yanagi et al. | 370/60.1 |

Primary Examiner—Douglas W. Olms
Assistant Examiner—Russell W. Blum
Attorney, Agent, or Firm—Baker & Botts

[57] ABSTRACT

Egress processing of asynchronous transfer mode (ATM) cells is performed by an egress processor (18) that receives ATM cells from an ingress processor (16) through a cell bus (20). ATM cells are received in the egress processor (18) through an egress FIFO buffer (32) and placed within available space in an ECELL memory (38) through a single cell FIFO buffer (34) as controlled by a cell loader (36). A linker (44) chains together ATM cells, no matter where they are located in the ECELL memory (38), corresponding to a particular call into a specific packet by placing pointer information within each ATM cell of a specific packet such that each ATM cell points to the next ATM cell within the packet. The linker (44) places the cell location of the first cell of the packet into a packet FIFO buffer (52) of a cell location buffer (48). An unlinker (46) uses the cell location within the packet FIFO buffer (52) to transmit ATM cells from the ECELL memory (38) to an egress line interface (22) according to the pointer information placed by the linker (44) into each ATM cell. When the unlinker (46) is ready to transmit ATM cells from the ECELL memory (38) before the linker (44) has finished chaining together a packet, the linker (44) places the cell location information directly into a cell FIFO buffer (50) within the cell location buffer (48) instead of within each ATM cell for immediate use by the unlinker (46).

20 Claims, 3 Drawing Sheets

APPARATUS AND METHOD FOR PROCESSING ASYNCHRONOUS TRANSFER MODE CELLS

TECHNICAL FIELD OF THE INVENTION

This invention relates in general to integrated communication networks and more particularly to an apparatus and method for processing asynchronous transfer mode cells.

BACKGROUND OF THE INVENTION

Conventional switching modules within a broadband integrated services digital network receive line information and convert the line information into asynchronous transfer mode (ATM) cells for communication transmission. ATM cells are typically placed in various queues and go through an arbitration process to determine an order of processing for each ATM cell. An individual ATM cell must reach the top of a queue in order to enter the arbitration process for a chance at being processed. This leads to delays in transferring packets defined by a plurality of ATM cells and leads to an unnecessary loss of ATM cells and packets.

From the foregoing, it may be appreciated that a need has arisen for a device that receives ATM cells corresponding to different packets and identify cells for individual packet transmission. A need has also arisen for a device that eliminates the use of queues and arbitration in processing ATM cells.

SUMMARY OF THE INVENTION

In accordance with the present invention, an apparatus and method for processing asynchronous transfer mode (ATM) cells are provided which substantially eliminate or reduce disadvantages and problems associated with conventional ATM cell processing.

The present invention includes a memory for receiving and storing asynchronous transfer mode cells wherein the ATM cells define a plurality of packets. A linker places pointer information within each ATM cell stored within the memory in order to chain together ATM cells into corresponding individual packets regardless of where in the memory the ATM cells are located. An unlinker transmits ATM cells from the memory that have been chained together by the linker to provide transmission of individual complete packets.

The present invention provides for various technical advantages over conventional ATM cell processing techniques. One technical advantage is the ability to link ATM cells corresponding to a specific packet regardless of when they are received or where they are placed within the memory. Another technical advantage is the ability to transmit a specific packet having ATM cells placed in non-consecutive locations within a memory. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
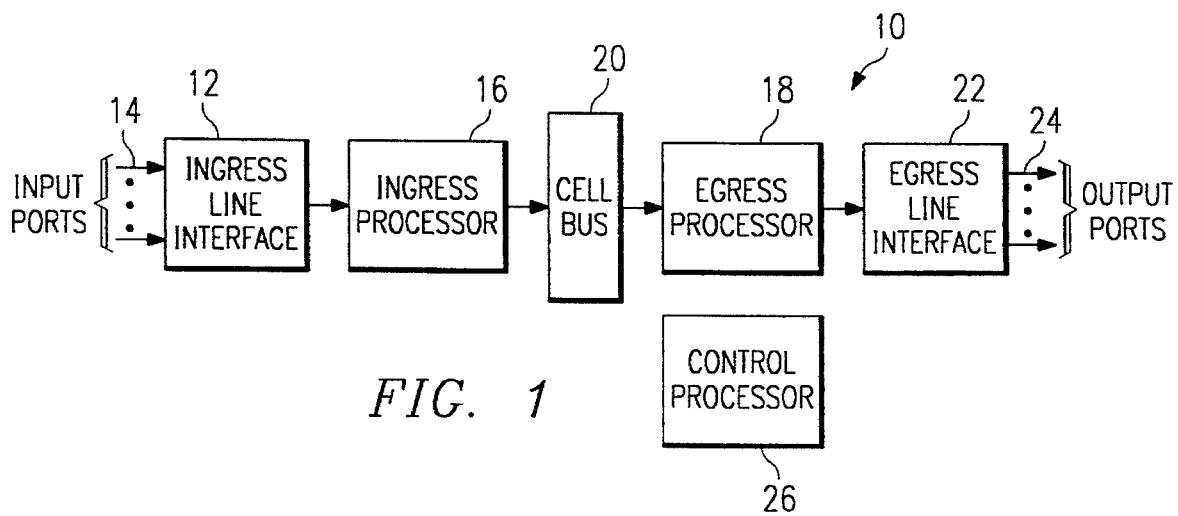
FIG. 1 illustrates a block diagram of processing hardware for a broadband switching module within an integrated services digital network.

FIG. 1 is a block diagram of a line processor 10 for a broadband switching module within an integrated services digital network. Line processor 10 includes an ingress line interface 12 receiving information off input ports 14. Ingress line interface 12 sends information to an ingress processor 16 that routes the information to an egress processor 18 through a cell bus 20. Information is transmitted from egress processor 18 through an egress line interface 22 onto output ports 24. A control processor (CP) 26 supervises operation of line processor 10 components. Though shown having single units, line processor 10 may have a plurality of ingress line interfaces 12, ingress processors 16, egress processors 18, and egress line interfaces 22 coupled to cell bus 20 in order to handle a multitude of input ports 14 and output ports 24.

In operation, ingress line interface 12 performs a service adaptation function on the incoming traffic received from input ports 14. The incoming traffic may have any of several configurations, such as frame relay or Switched Multi-Megabit Data Service (SMDS) protocols. The incoming traffic is converted into asynchronous transfer mode (ATM) cells according to the service provided on a given input port 14. Each ATM cell typically comprises 53 bytes as described in Appendix A. Ingress processor 16 receives the ATM cells from ingress line interface 12 and performs protocol checks, determines routing paths for the ATM cells, and formats each ATM cell into a 64 byte block. Appendix B shows the 64 byte block of a formatted ATM cell with the shaded area identifying the 53 byte ATM cell placement. Ingress processor 16 generates a setup ATM cell and a teardown ATM cell that carry routing information to open and close a transmission link, respectively, and transfers the setup ATM cell, the teardown ATM cell, and other formatted ATM cells to egress processor 18 through cell bus 20. Further information on setup and teardown cells can be found in copending U.S. patent application Ser. No. 08/188,559, entitled "Method of Transmitting Call Information Prior to Establishing a Connection Path", which is incorporated by reference herein.

Egress processor 18 identifies formatted ATM cells corresponding to a particular call and effectively places corresponding formatted ATM cells into a particular packet for output transmission. Egress line interface 22 receives each packet from egress processor 18 and converts the packets from formatted ATM cells into the appropriate service specific traffic according to the appropriate output port 24. The present invention may lie within either ingress processor 16 or egress processor 18, but for discussion purposes reference is made to egress processor 18. Further information on ingress processing can be found in copending U.S. patent application Ser. No. 08/188,671, entitled "Method Apparatus for Route Processing Asynchronous Transfer Mode Cells", which is incorporated by reference herein. Further information on route generation can be found in copending U.S. patent application Ser. No. 08/188,310, entitled "Method and Apparatus for Generating Route Information for Asynchronous Transfer Mode Cell Processing", which is incorporated by reference herein.

Figure 2:
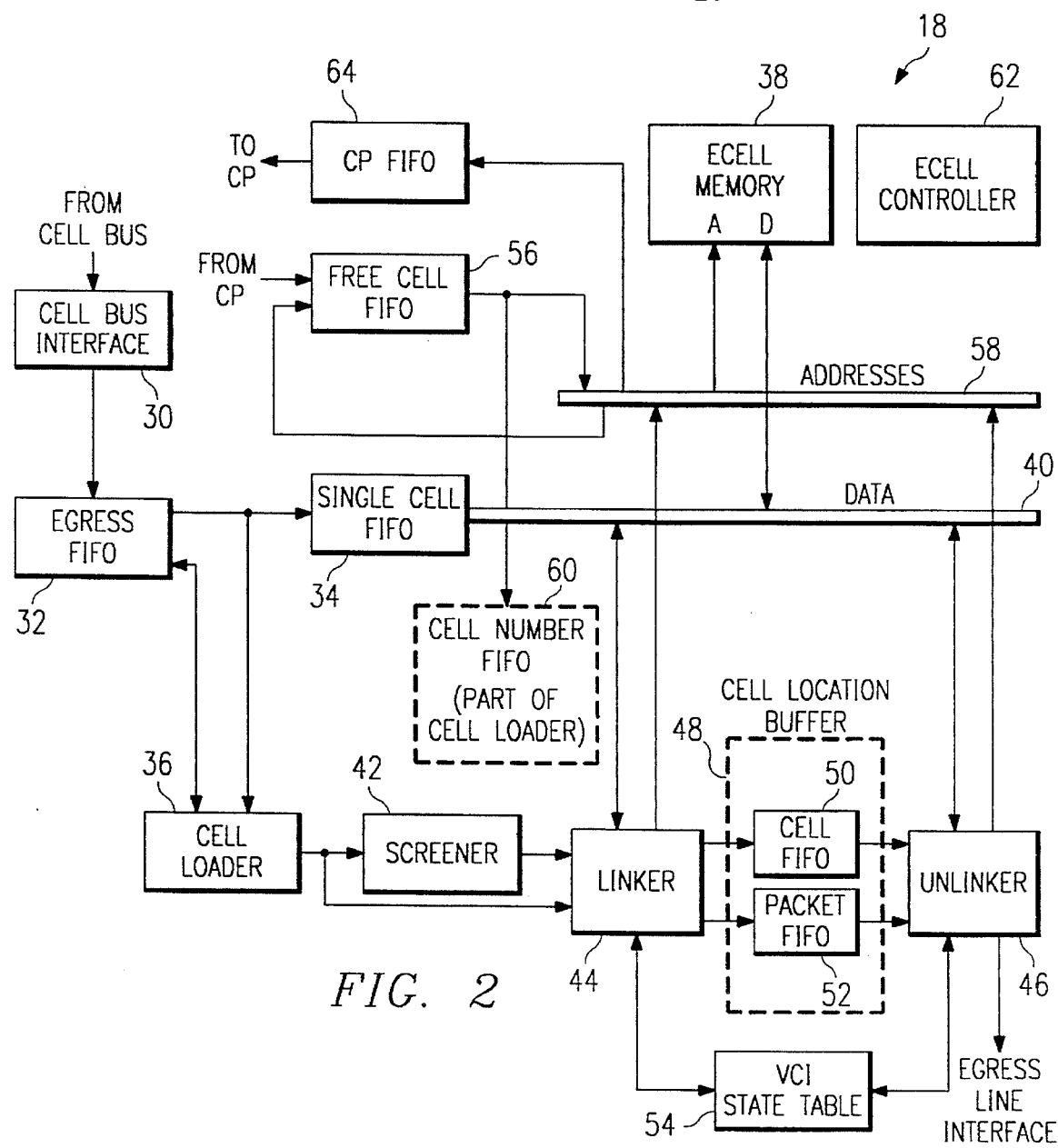
FIG. 2 illustrates a block diagram of an egress processor within the broadband switching module.

FIG. 2 is a block diagram of egress processor 18. Egress processor 18 includes a cell bus interface 30 that coordinates the receipt of formatted ATM cells from cell bus 20. Further information on cell bus generation can be found in copending U.S. patent application Ser. No. 08/015,695, entitled "High-Speed Packet Bus" which is incorporated by reference herein. Cell bus interface 30 places the formatted ATM cells into an egress first in, first out (FIFO) buffer 32. Egress FIFO buffer 32 transmits cell data and control information to a single cell FIFO buffer 34 and a cell loader 36, respectively. Single cell FIFO buffer 34 transmits cell data to an egress cell (ECELL) memory 38 over a data bus 40. Cell loader 36 sends information to a screener 42 that determines whether a particular cell needs to be screened for its particular destination and source address. Screener 42 provides screening status to a linker 44 that links appropriate formatted ATM cells into individual packets.

Linker 44 provides packet-linked formatted ATM cells to an unlinker 46 through a cell location buffer 48 having a cell FIFO buffer 50 and a packet FIFO buffer 52. A virtual circuit identifier (VCI) state table 54 provides packet associated information for both linker 44 and unlinker 46. Formatted ATM cell locations within ECELL memory 38 are determined by a free cell FIFO buffer 56 that controls an address bus 58. Cell location information is passed along from the screener 42 to linker 44 to unlinker 46 from a cell number FIFO buffer 60. Cell number FIFO buffer 60 is preferably part of cell loader 36. An ECELL controller 62 services requests for access to ECELL memory 38. Control processor 26 initializes free cell FIFO 56 with free cell locations in ECELL memory 38. Control processor 26 may receive ATM cells through CP FIFO buffer 64.

In operation, formatted ATM cells pass from cell bus interface 30 through egress FIFO buffer 32 to cell loader 36. Cell loader 36 processes the formatted ATM cells into a different 64 byte configuration for storage in ECELL memory 38 through single cell FIFO buffer 34. Appendix C identifies what information is included within each formatted ATM cell stored in ECELL memory 38 after processing by cell loader 36. Cell loader initializes the next pointer and error code fields within the formatted ATM cell to zero. Cell loader 36 also gathers information from the formatted ATM cells for use by screener 42. Screener 42 determines a screener status and replaces a screen type with the screener status, indicating whether a particular ATM setup cell has failed screening for either its destination or source address. Screener 42 provides screener status information to linker 44.

Formatted ATM cells are placed anywhere within ECELL memory 38 as locations become available as determined by free cell FIFO buffer 56. In this manner, formatted ATM cells for a specific message may not be placed in consecutive locations within ECELL memory 38, especially when messages are received simultaneously at ingress processor 16 with formatted ATM cells of different messages being interweaved onto cell bus 20. Linker 44 identifies cells corresponding to each particular message and links the formatted ATM cells for a particular message into a packet. Linker 44 links together formatted ATM cells by placing pointer information within the next pointer field of each formatted ATM cell such that each formatted ATM cell identifies the next ATM cell within the chain for a particular packet.

Cell location buffer 48 receives either a cell location of a first cell of a linked packet within packet FIFO buffer 52 or receives individual unlinked formatted ATM cell locations from linker 44 within cell FIFO buffer 50. When unlinker 46 is not ready to unlink formatted ATM cells from ECELL memory 38, linker 44 places the cell location of the first formatted ATM cell of a packet into packet FIFO buffer 52 and continues chaining appropriate formatted ATM cells together within ECELL memory 38 for the entire packet. If unlinker 46 begins unlinking a packet from ECELL memory 38 before linker 44 is finished chaining formatted ATM cells together for the packet, linker 44 places the cell locations for the unlinked formatted ATM cells into cell FIFO buffer 50 of cell location buffer 48 for use by unlinker 46. Cell locations within cell FIFO buffer 50 have a higher priority for processing than cell locations within packet FIFO buffer 52. Linker 44 and unlinker 46 use VCI state table 54 to link formatted ATM cells into packets and to access and update state information for a particular VCI used by a packet and unlinked formatted ATM cells. The VCI is used to associate cells within a packet. VCI state table 54 includes the following information:

State (4 bits)
    SMDS protocol data unit (PDU) (1 bit)
    Frame relay PDU (1 bit)
    bits 3 and 4 have the following meaning: 00= idle, 01=wait for beginning of message (BOM), 10=wait for continuation of message/end of message (COM/EOM), not sending, 11= wait for COM/EOM, sending (Note: The unlinker changes the state to sending when remaining cells in a packet should be passed through the cell FIFO 50 by the linker)

expected sequence number (4 bits)

expected cell count (8 bits)

expected EOM L2 length (for SMDS protocol) (4 bits)

expected BOM Begin/End (BE) tag (8 bits)

expected EOM L3 length (for Frame Relay protocol) (16 bits)

first cell number pointer (16 bits)

last cell number pointer (16 bits)

(Note: These pointers are used to chain cells within a packet)

Figure 3:
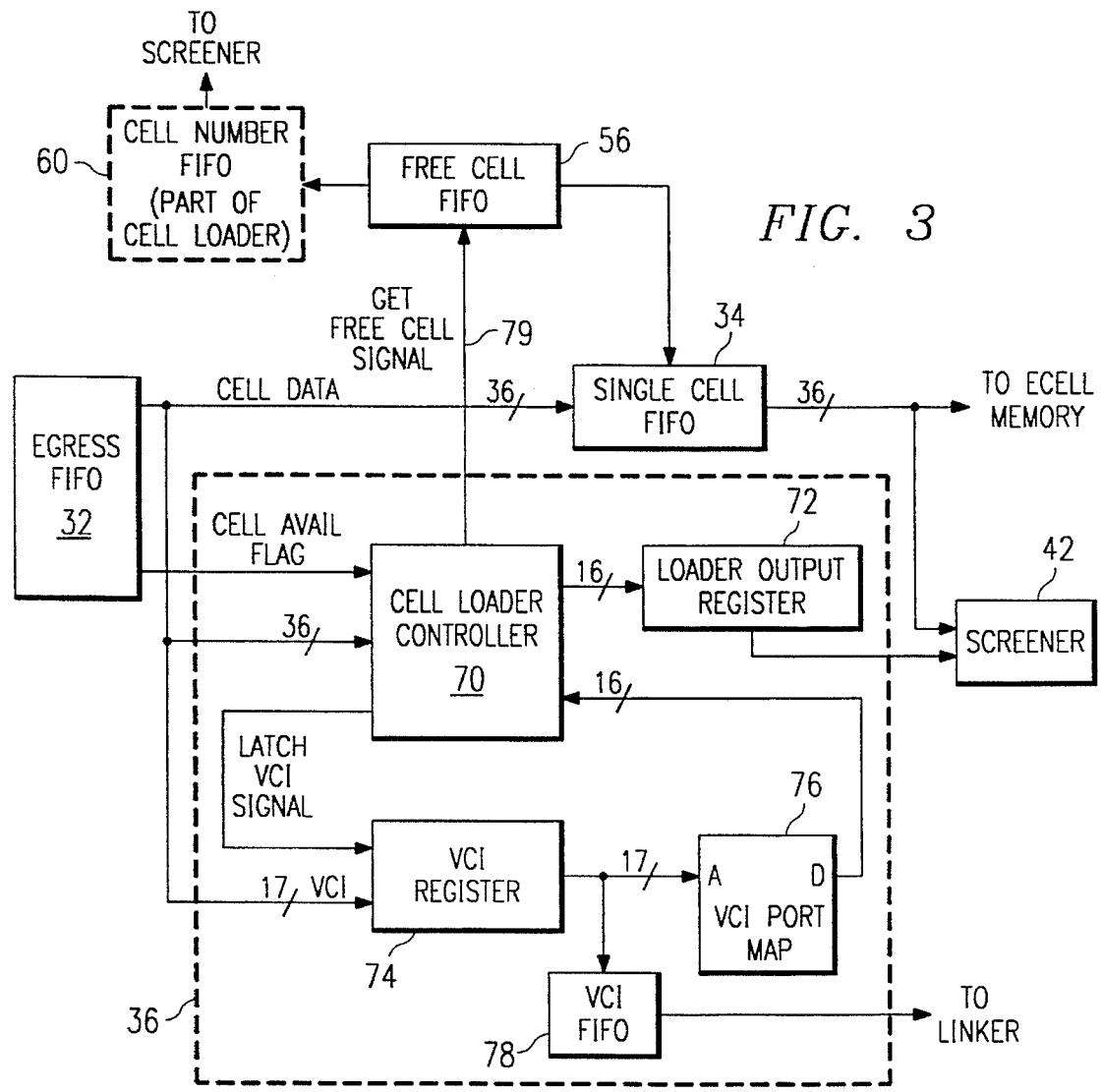
FIG. 3 illustrates a block diagram of a cell loader and its relationship with other components within the egress processor.

FIG. 3 is a block diagram of cell loader 36 and its relationship to other components within egress processor 18. Cell loader 36 includes a cell loader controller 70 that receives formatted ATM cell information from egress FIFO buffer 32, drives a loader output register 72, and provides a latch VCI signal for a VCI register 74. VCI register 74 also receives VCI information from each formatted ATM cell transmitted by egress FIFO buffer 32 and generates a VCI address for a VCI port map 76. VCI port map 76 provides information for cell loader controller 70 that is processed into loader output register 72. VCI register 74 also sends its generated VCI address to a VCI FIFO buffer 78 for use by linker 44.

In operation, cell loader controller 70 receives a cell available flag from egress FIFO buffer 32, causing cell loader controller 70 to receive a formatted ATM cell from egress FIFO buffer 32 and process it before transmitting the formatted ATM cell to single cell FIFO buffer 34. Cell loader controller 70 captures information from the formatted ATM cell while it is being transferred to single cell FIFO buffer 34 including the VCI, a VCI check field, a cell type, a segment type, a sequence number, and a protocol identifier. VCI register 74 receives VCI information from the formatted ATM cell as controlled by cell loader controller 70 and generates an address for VCI port map 76. VCI port map 76 supplies port mask, VCI check, and screen type information to cell loader controller 70. The port mask defines which of the possible output ports 24 are to be used for transmitting the formatted ATM cell. Cell loader controller 70 receives the port mask from VCI port map 76 and calculates a highest priority port and sends this information to loader output register 72. VCI information driving VCI port map 76 is also provided to linker 44 through VCI FIFO buffer 78 that is used to access a VCI entry within VCI state table 54. Loader output register 72 receives information from cell loader controller 70 including:

port number (4 bits)

cell type (2 bits)

segment type (2 bits)

sequence number (4 bits)

Frame Relay/SMDS protocol type (1 bit)

screen type (2 bits)

VCI error (1 bit)

Loader output register 72 uses this information to drive screener 42.

Cell loader controller 70 also generates a get free cell signal 79 for controlling free cell FIFO buffer 56. Free cell FIFO buffer 56 provides a signal to ECELL controller 62, initiating a transfer of a formatted ATM cell from single cell FIFO buffer 34 to ECELL memory 38 at the cell location provided by free cell FIFO buffer 56. Free cell FIFO buffer 56 also provides the cell location to cell number FIFO buffer 60 for use by screener 42 and linker 44.

Figure 4:
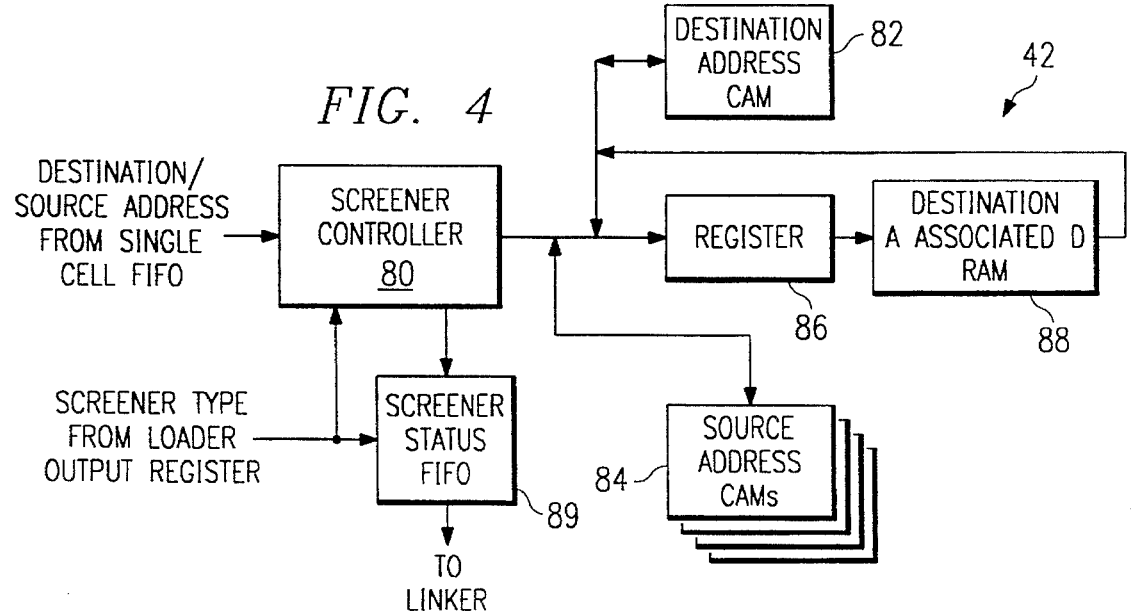
FIG. 4 illustrates a block diagram of a screener within the egress processor.

FIG. 4 is a block diagram of screener 42. Screener 42 includes a screener controller 80 driving a destination content addressable memory (CAM) 82 and source CAMs 84. Screener controller 80 also drives a register 86 that provides information to a destination associated random access memory (RAM) 88. Screener controller 80 provides output information through a screener status FIFO buffer 89.

In operation, screener 42 determines whether a particular cell is to be screened out. Cells can be screened out by either their source address or their destination address. Screener 42 receives the destination address and source address from single cell FIFO buffer 34 as the formatted ATM cell is being sent to ECELL memory 38. Screener controller 80 also receives the screener type from loader output register 72 as determined by VCI port map 76 of FIG. 3. Screener 42 uses this information to determine the screener status for the particular cell.

If screening is to take place, screener controller 80 looks up the port number and destination address in destination CAM 82. If no match can be found in destination CAM 82, then this destination cannot be reached from this port and the screener status indicates that the destination address is screened out and the corresponding cell is ultimately discarded. Upon finding a match, screener controller 80 loads the matching address information from destination CAM 82 into register 86. Destination associated RAM 88 uses the address from register 86 to look up the screen number and a screened allowed bit. Screener controller 80 looks up the screen number, port number, and source address from source CAMs 84 and compares this to the information received from destination associated RAM 88. A match bit is set indicating that a match has occurred. The match bit is exclusive-or'ed with the screen allowed bit by screener controller 80. If the result of the exclusive-or is false, screener controller 80 indicates that the source address is screened out in the screener status. Screener status information is placed in screener status FIFO buffer 89, indicating whether the destination and/or the source address is screened out. Screener status FIFO buffer 89 provides screener status to linker 44.

Figure 5:
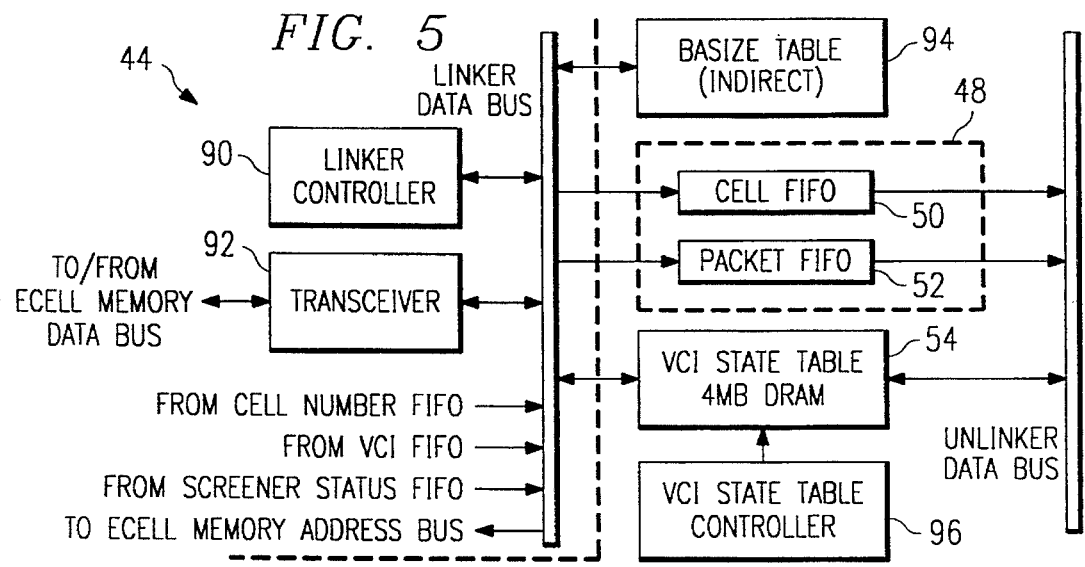
FIG. 5 illustrates a block diagram of a linker and its relationship to other components within the egress processor.

FIG. 5 is a block diagram of linker 44 and its relationship with other components within egress processor 18. Linker 44 includes a linker controller 90 and a transceiver 92. Linker 44 also indirectly uses a buffer allocation size (BASIZE) table 94 found in unlinker 46. BASIZE table 94 is indexed by BOM BASIZE for SMDS protocol and EOM is length for Frame Relay protocol. BASIZE table 94 includes expected EOM L2 length and expected cell count for SMDS protocol and frame relay length for Frame Relay protocol. Linker 44 performs cell sequence checking and links cells of the same message, according to the message identification (MID) field within each cell, together in a chain or packet.

In operation, linker controller 90 receives VCI information from VCI FIFO buffer 78 of FIG. 3 to index VCI state table 54 as supervised by a VCI state table controller 96. Linker controller 90 sets a VCI lock signal for the VCI state table entry corresponding to the VCI information from VCI FIFO buffer 78 to keep unlinker 46 from accessing this entry in order to allow linker 44 to complete its processing. Linker controller 90 takes the first word from the indexed entry in VCI state table 54 containing the state bits, the expected sequence number, and the expected cell count. The state bits are checked against the cell type received from loader output register 72 through screener status FIFO buffer 89 of FIG. 4.

The packet may have one of four cell types—a setup cell, a beginning of message/single segment message (BOM/SSM) cell, a continuation of message or end of message (COM/EOM) cell, or a teardown cell. The state bits from VCI state table 54 indicate one of four operating states— Idle, Wait for BOM, Wait for COM/EOM not sending, and Wait for COM/EOM sending. If the state for the indexed VCI entry in VCI state table 54 is Idle and the cell type is a setup cell, then the setup cell is processed, otherwise the cell is discarded. If the state is Wait for BOM, a BOM/SSM cell is processed and error messages are generated for setup, teardown, or COM/EOM cells. If either Wait for COM/EOM states occur, a COM/EOM cell is processed and error messages are generated for setup, teardown, or BOM/SSM cells.

For setup cell processing, linker controller 90 writes the setup cell number to the first cell number field and the last cell number field in VCI state table 54 to indicate the chain beginning and current chain end for a packet. Linker controller 90 then sets the new state within VCI state table 54 to Wait for BOM.

For processing a BOM/SSM cell, linker controller 90 obtains the BOM BASIZE from the formatted ATM cell stored in ECELL memory 38 and performs a look up in BASIZE table 94 to get the expected cell count and EOM L2 length (for an SMDS protocol). Linker controller 90 determines a BOM begin/end (BE) tag from the expected cell count and writes the BE tag, the expected cell count, the expected sequence number, and the EOM L2 length to VCI state table 54. If this is a BOM cell, linker controller 90 sends the BOM cell, decrements the expected cell count within VCI state table 54, and changes the state to Wait for COM/EOM. SSM cells are processed similarly to EOM cell processing.

For COM/EOM cell processing, linker controller 90 checks the cell sequence number of the formatted ATM cell against the expected sequence number within VCI state table 54. If there is a match, the cell sequence number is incremented; otherwise an error message is generated. Linker controller 90 next compares the segment type against the cell count. A non-zero cell count and a COM segment type indicates that a COM cell is ready to be sent. A cell count of zero and an EOM segment type indicates that an EOM cell is ready to be sent. In all other cases, an error message is generated. Linker controller 90 decrements the cell count and a COM (or EOM) cell is sent at this time.

EOM and SSM cells require some additional processing. Linker controller 90 compares the BOM BE tag from VCI state table 54 to the EOM BE tag from the formatted ATM cell in ECELL memory 38. If they are not equal, an error message is processed. Linker controller 90 then compares the BOM BASIZE from the formatted ATM cell in ECELL memory 38 to the EOM L3 length from VCI state table 54. If they are not equal, an error message is generated. For SMDS protocol, linker controller 90 is now ready to send the EOM/SSM cell. For Frame Relay protocol, linker controller 90 retrieves the frame relay length from the EOM cell and looks up the BOM BASIZE from BASIZE table 94 which is written to the setup cell, the BOM cell, and the EOM cell. Linker controller 90 is now ready to send the EOM/SSM cell for Frame Relay protocol.

For sending any type of cell, linker controller 90 examines the state bits to determine if the current status is Wait for COM/EOM Sending or Wait for COM/EOM Not Sending. If the status is sending, linker controller 90 writes the cell number to cell FIFO buffer 50 within cell location buffer 48. If the status is not sending, linker controller 90 chains the cell to the previous cell and writes the cell location to the last cell number field in VCI state table 54. Linker controller 90 next determines if the setup cell is to be sent through packet FIFO buffer 52 within cell location buffer 48. The setup cell is to be sent to packet FIFO buffer 52 if there is an SSM cell, a BOM cell which is neither single MID nor frame relay, or an EOM cell which is single MID or frame relay. If a cell is to be discarded, it is sent through cell FIFO buffer 50 of cell location buffer 48.

Figure 6:
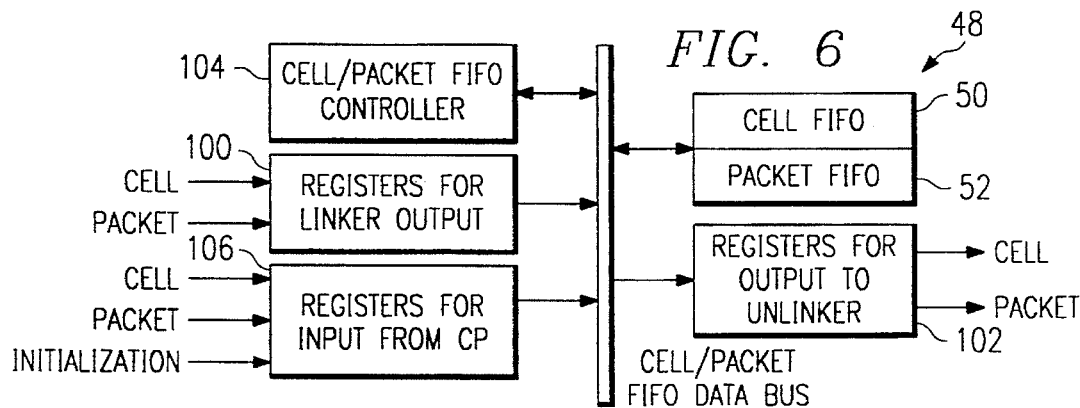
FIG. 6 illustrates a block diagram of a cell location buffer within the egress processor.

FIG. 6 is a block diagram of cell location buffer 48. Cell location buffer 48 includes registers 100 for receiving cell and packet location information from linker 44 and registers 102 for sending cell and packet location information to unlinker 46. A cell/packet FIFO buffer controller 104 controls the flow of information between registers 100 and 102 and cell FIFO buffer 50 and packet FIFO buffer 52. Cell location buffer 48 also includes registers 106 for direct interface to control processor 26. The CP uses registers 106 to send cells and packets during initialization or for testing purposes.

Figure 7:
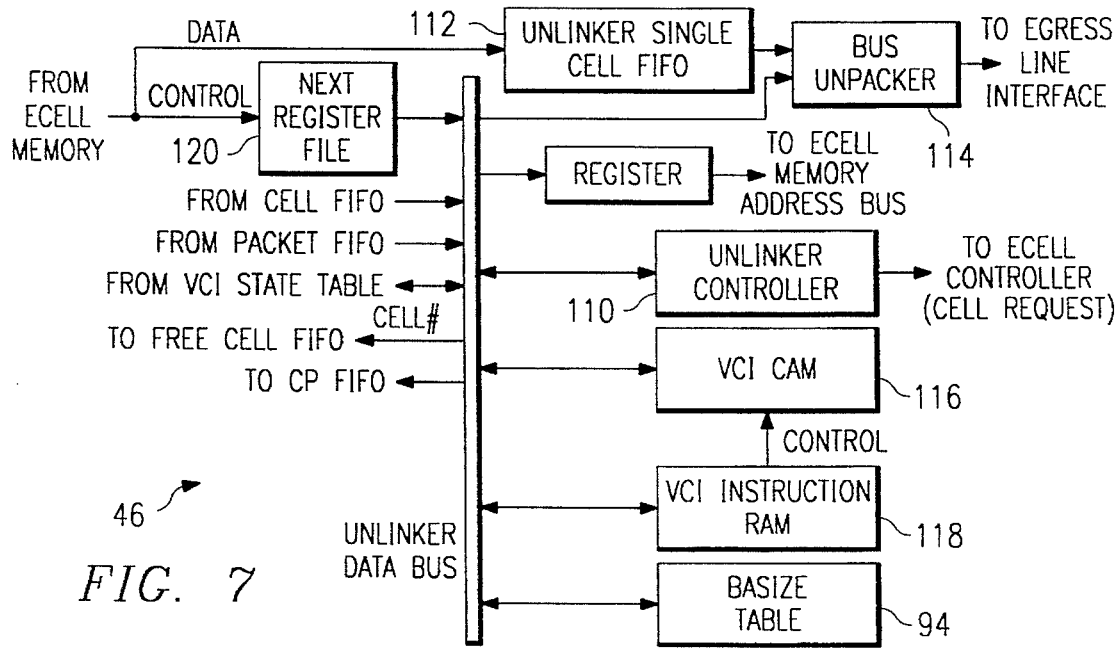
FIG. 7 illustrates a block diagram of an unlinker and its relationship to other components within the egress processor.

FIG. 7 is a block diagram of unlinker 46. Unlinker 46 includes an unlinker controller 110 controlling formatted ATM cell data flow from ECELL memory 38 through an unlinker single cell FIFO buffer 112 and a bus unpacker 114 to egress line interface 22. Unlinker 46 also includes a VCI CAM 116 and a VCI instruction RAM 118 for message identification (MID) allocation at the appropriate output ports. A next register file 120 extracts control information from formatted ATM cell data within ECELL memory 38. BASIZE table 94, which was indirectly used by linker 44 in FIG. 5, is located within unlinker 46.

Unlinker processing operates under a priority scheme where a cell location in cell FIFO buffer 50 has the highest priority, a chain left over has the next priority, and a setup cell in packet FIFO buffer 52 has the lowest priority. For processing of a new packet, unlinker 46 detects the presence of a setup cell in packet FIFO buffer 52. Unlinker controller 110 locks the VCI entry in VCI state table 54 corresponding to the VCI of the packet to prevent linker 44 from processing cells on this VCI. Unlinker controller 110 determines whether there is an MID available in VCI CAM 116 for the specified port determined by VCI port map 76 of cell loader 36. Microcode within VCI instruction RAM 118 causes VCI CAM 116 to search for an unallocated MID for this port. If none is found, unlinker controller 110 proceeds on to the next port. If an unallocated MID is found for this port, formatted ATM cell data from ECELL memory 38 is placed in unlinker single cell FIFO buffer 112 and next register file 120 receives control information from the formatted ATM cell in ECELL memory 38 including VCI information, next cell location, and the BASIZE for the formatted ATM cell. Unlinker controller 110 sets a chain active bit for this port unless error processing in linker 44 indicates an abort, causing a bad chain bit to be set for this port by unlinker controller 110.

For processing an active chain, unlinker controller 110 places the next cell location from next register file 120 into register 121 in order to get the next formatted ATM cell within the packet from ECELL memory 38. Unlinker controller 110 locks the VCI entry in VCI state table 54 corresponding to the VCI of the packet to prevent linker 44 from processing cells on this VCI. Microcode in VCI instruction RAM 118 causes VCI CAM 116 to search for the allocated MID. If none is found, the cell is discarded and unlinker controller 110 writes the cell location to either free cell FIFO buffer 56 or CP FIFO buffer 64, depending on the aggregation options set by control processor 26. If the cell location goes to CP FIFO buffer 64, control processor 26 pushes the cell location onto free cell FIFO buffer 56 after processing CP FIFO buffer 64. If an MID allocation is found in VCI CAM 116, VCI instruction RAM 118 causes VCI CAM 116 to get the MID, sequence number, and setup cell number, place them in unlinker controller 110, increment the sequence number, and write the MID and sequence number back to VCI CAM 116. Unlinker controller 110 writes the MID, sequence number, and segment type to bus unpacker 114. Bus unpacker 114 transmits the ATM cell containing all appropriate information to egress line interface 22. As with a discarded cell, the transmitted cell location is written to either free cell FIFO buffer 56 or CP FIFO buffer 64 by unlinker controller 110 as determined by control processor 26.

For processing a cell in cell FIFO buffer 50, unlinker controller 110 uses the cell location from cell FIFO buffer 50 instead of the next cell location in next register file 120 derived from the next pointer field within the formatted ATM cell from ECELL memory 38 as used when processing an active chain. Unlinker controller 110 locks the VCI in VCI state table 54 corresponding to the VCI of the formatted ATM cell to prevent linker 44 from processing cells on this VCI. Similarly to active chain processing, VCI instruction RAM 118 microcode causes VCI CAM 116 to search for an unallocated MID for the specified port. If no allocation is found, the cell is discarded and unlinker controller 110 writes the cell location to either cell FIFO buffer 56 or CP FIFO buffer 64 according to aggregation options set by control processor 26. If an MID allocation is found, the MID, sequence number, and setup cell number from VCI CAM 116 are stored in unlinker controller 110, the sequence number is incremented, and the MID and sequence number are written back to VCI CAM 116. Unlinker controller 110 writes the MID, sequence number, and segment type to bus unpacker 114. Bus unpacker 114 transmits the ATM cell containing all appropriate information to egress line interface 22.

For transmission processing, bus unpacker 114 receives the MID, sequence number, and segment type from unlinker controller 110 and inserts them into the ATM cell received from ECELL memory 38 through unlinker single cell FIFO buffer 112. Bus unpacker 114 then transmits the cell from unlinker single cell FIFO buffer 112 to egress line interface 22.

In summary, an egress processor receives ATM cells from a cell bus and places them within available locations in a memory. A linker chains together ATM cells within the memory corresponding to a particular call into a packet by placing pointer information into each ATM cell such that each ATM cell identifies the next ATM cell in the packet chain. The linker provides the first ATM cell location of a packet to an unlinker that transmits the ATM cells of the packet from memory according to the pointer information placed within each ATM cell. If the unlinker is ready to process ATM cells before the linker has chained them together, the linker places the cell locations for the ATM cells of the particular packet directly into a buffer for use by the unlinker. No matter where ATM cells are located within the memory, ATM cells corresponding to specific packets can be identified for subsequent transmission in a communication network.

Thus, it is apparent that there has been provided, in accordance with the present invention, a method and apparatus for processing asynchronous transfer mode cells that satisfy the advantages set forth above. Although the preferred embodiment has been described in detail, it should be understood that various changes, substitutions, and alterations can be made herein without departing from the spirit and scope of the present invention as defined by the following claims.

APPENDIX A
ATM Cell Format

| ATM Cell Header | | | | | ATM Cell Payload   The ATM cell payload shown here is an SMDS SSM | | | |
|---|---|---|---|---|---|---|---|---|
| Sig VP1 | Sig VC1 | Payload Type | Cell Loss Priority | HBC | Segment Type | Sequence Number | Message Identifier | Ravd |
| | | | | | 10 = BOM = Beginning Message Cell | | | |
| | | | | | 00 = COM = Continuation of Message Cell | | | |
| | | | | | 01 = EOM = End of Message Cell | | | |
| | | | | | 11 = SSM = Single Segment Message Cell | | | |
| 12 bits | 16 bits | 3 bits | 1 bit | 1 | 2 bits | 4 bits | 10 bits | 1 |

| ATM Cell Payload The ATM cell payload shown here in an SMDS SSM | | | | | | | |
|---|---|---|---|---|---|---|---|
| Beginning-End Tag 1 | Buffer Allocation Size | Payload | Ravd | Beginning-End Tag 2 | L3 Length (=BA) | L2 Length | CRC 10 |
| 1 | 2 | 36 | 1 | 1 | 2 | 6 bits | 10 bits |

| ATM Cell Format | |
|---|---|
| Sig VPI | Signalling VPI
The VPI assigned for ATM signalling. |
| SIG VCI | Signalling VCI
The VCI assigned for ATM signalling. |
| PT | Payload Type |
| CLP | Cell Loss Priority |
| HEC | Header Extension Check
ATM-complaint CRC check across the cell header. |
| Seg | Segment Type
10 = BOM = beginning of message cell
00 = COM = continuation of message cell
01 = EOM = end of message cell
11 = SSM = single segment message cell |
| Seq | Sequence Number
A modulo incrementing sequence number according to AAL4 specifications. |
| MID | Message Identifier |
| Rsvd | Reserved |
| BE1 | Beginning/End Tag 1
A modulo incrementing tag which should match BE2. The value should be incremented for each signalling packet on the signalling circuit. |
| BA | Buffer Allocation Size |
| Payload | Payload
This is where the 36 octet signalling packet is placed. It is filled in according to the information on the following pages. |
| Rsvd | Reserved |
| BE2 | Beginning/End Tag 2
Should match BE1. |
| L3Len | L3 Length (= BA) |
| L2Len | L2 Length |
| CRC10 | CRC 10-bit
This is a 10-bit CRC calculated over the cell contents according to the AAL4 specifications. |

APPENDIX B
Cell Format in Ingress Processor

| Next Pointer | | Error Code | |
|---|---|---|---|
| (Not Used) | | Routing Label | |
| Routing Label | VCI | | VCI |
| VCI | Header Error Corr. | | MID |
| L2PDU | | Payload | |
| L2 length + CRC10 | | pseudo VCI | |

32 bits

APPENDIX C
Cell Format in Egress Processor

| Error Code | | (Not Used) | |
|---|---|---|---|
| Next Pointer | | Routing Label | |
| Routing Label | VCI | | VCI |
| VCI | Header Error Corr. | | MID |
| L2PDU | | Payload | |
| L2 length + CRC10 | | (not used) | |

32 bits

What is claimed is:

1. An apparatus for processing asynchronous transfer mode cells, comprising:

a memory for receiving and storing a plurality of asynchronous transfer mode cells, said asynchronous transfer mode cells defining a plurality of packets;

a linker coupled to said memory for placing pointer information within each asynchronous transfer mode cell stored in said memory in order to chain together corresponding asynchronous transfer mode cells into associated specific packets;

an unlinker coupled to said memory for transmitting from said memory asynchronous transfer mode cells corresponding to a specific packet as chained together by said linker.

2. The apparatus of claim 1, further comprising:

a packet buffer for storing a first asynchronous transfer mode cell location associated with said memory of said specific packet received from said linker, said unlinker transmitting from said memory a first asynchronous transfer mode cell corresponding to said first asynchronous transfer mode cell location stored within said packet buffer and successive asynchronous transfer mode cells of said specific packet in response to said pointer information placed within each asynchronous transfer mode cell by said linker.

3. The apparatus of claim 2, further comprising:

a cell buffer for storing asynchronous transfer mode cell locations associated with said memory of an unlinked specific packet received from said linker, said unlinker transmitting asynchronous transfer mode cells of said unlinked specific packet in response to said asynchronous transfer mode cell locations, wherein asynchronous transfer mode cell locations within said cell buffer have a higher priority than asynchronous transfer mode cell locations within said packet buffer.

4. The apparatus of claim 1, further comprising:

a cell buffer for storing asynchronous transfer mode cell locations associated with said memory of an unlinked specific packet received from said linker, said unlinker transmitting asynchronous transfer mode cells of said unlinked specific packet in response to said asynchronous transfer mode cell locations.

5. The apparatus of claim 1, further comprising:

a virtual circuit identifier state table for storing information corresponding to each packet, said virtual circuit identifier state table having a plurality of entries, each entry being indexed by a unique virtual circuit identifier located within each asynchronous transfer mode cell, said linker and said unlinker having access to information within said virtual circuit identifier state table.

6. The apparatus of claim 5, wherein said unlinker locks a particular entry of said virtual circuit identifier state table to prevent said linker from processing asynchronous transfer mode cells having a same virtual circuit identifier as asynchronous transfer mode cells being transmitted by said unlinker.

7. The apparatus of claim 5, further comprising:

a virtual circuit identifier first in, first out buffer for receiving a virtual circuit identifier from asynchronous transfer mode cells stored within said memory, said linker accessing said virtual circuit identifier state table from said virtual circuit identifier within said virtual circuit identifier first in, first out buffer.

8. The apparatus of claim 1, further comprising:

a screener coupled to said linker for determining which asynchronous transfer mode cells are not to be transmitted by said unlinker.

9. The apparatus of claim 1, further comprising:

a cell loader for controlling receipt and storage of asynchronous transfer mode cells at said memory, said cell loader providing asynchronous transfer mode cell locations to said linker for processing of asynchronous transfer mode cells.

10. The apparatus of claim 9, wherein said cell loader determines an output port of the apparatus for transmission of asynchronous transfer mode cells.

11. An apparatus for processing asynchronous transfer mode cells, comprising:

a memory for receiving and storing a plurality of asynchronous transfer mode cells corresponding to a plurality of packets, wherein each packet represents a separate call;

a cell loader for controlling storage of asynchronous transfer mode cells into said memory and for identifying virtual circuit identifier information contained within each asynchronous transfer mode cell;

a linker for placing pointer information within each asynchronous transfer mode cell stored within said memory, said linker identifying specific packets by chaining together corresponding asynchronous transfer mode cells regardless of where asynchronous transfer mode cells are stored within said memory;

an unlinker for outputting asynchronous transfer mode cells corresponding to a specific packet as chained together by said linker;

a virtual circuit identifier state table accessible by said linker and said unlinker for storing information corresponding to each specific packet, said virtual circuit identifier state table having entries accessed by said virtual circuit identifier information within each asynchronous transfer mode cell, wherein said virtual circuit identifier state table controls processing of said asynchronous transfer mode cells by said linker.

12. The apparatus of claim 11, further comprising:

a packet buffer for storing a first asynchronous transfer mode cell location of asynchronous transfer mode cells chained together into a specific packet from said linker, said unlinker transmitting asynchronous transfer mode cells from said memory corresponding to said specific packet in response to said first asynchronous transfer mode cell location stored in said packet buffer.

13. The apparatus of claim 11, further comprising:

a cell buffer for storing locations of asynchronous transfer mode cells corresponding to an unchained packet, said unlinker transmitting asynchronous transfer mode cells corresponding to said unchained packet in response to asynchronous transfer mode cell locations stored in said cell buffer.

14. The apparatus of claim 11, wherein an entry accessed within said virtual circuit identifier state table by said linker is protected from simultaneous access by said unlinker.

15. The apparatus of claim 11, further comprising:

a screener for indicating which asynchronous transfer mode cells are not to be transmitted by said unlinker.

16. A method of processing asynchronous transfer mode cells, comprising the steps of:

receiving a plurality of asynchronous transfer mode cells;

storing each asynchronous transfer mode cell in any available space within a memory;

identifying asynchronous transfer mode cells corresponding to a packet regardless of a memory location of each asynchronous transfer mode cell;

placing a memory location of a successive asynchronous transfer mode cell within each asynchronous transfer mode cell in order to link asynchronous transfer mode cells together into the packet;

transmitting each asynchronous transfer mode cell corresponding to the packet.

17. The method of claim 16, further comprising the steps of:

retrieving and storing virtual circuit identifier information from each asynchronous transfer mode cell;

accessing a virtual circuit identifier entry in response to said Virtual circuit identifier information;

processing each asynchronous transfer mode cell as controlled by data within the virtual circuit identifier entry.

18. The method of claim 17, further comprising the step of:

preventing access to the virtual circuit identifier entry for unprocessed asynchronous transfer mode cells during transmission of the packet with asynchronous transfer mode cells having virtual circuit identifier information corresponding to the virtual circuit identifier entry.

19. The method of claim 16, further comprising the step of:

screening each asynchronous transfer mode cell to determine which asynchronous transfer mode cells are not to be transmitted.

20. The method of claim 16, further comprising the steps of:

storing memory locations of asynchronous transfer mode cells corresponding to an unlinked packet into a buffer;

transmitting asynchronous transfer mode cells of the unlinked packet in response to memory locations stored in the buffer.

* * * * *